(12) United States Patent
Huibers et al.

(10) Patent No.: US 7,085,035 B2
(45) Date of Patent: Aug. 1, 2006

(54) DISPLAY APPARATUS WITH IMPROVED CONTRAST RATIO

(75) Inventors: Andrew Huibers, Palo Alto, CA (US); Satyadev Patel, Sunnyvale, CA (US); Peter Heureux, Felton, CA (US); Robert Duboc, Menlo Park, CA (US); Regis Grasser, Mountain View, CA (US)

(73) Assignee: Reflectivity, INC, Sunnyvale, CA (US)

( * ) Notice: Subject to any disclaimer, the term of this patent is extended or adjusted under 35 U.S.C. 154(b) by 100 days.

(21) Appl. No.: 10/969,502

(22) Filed: Oct. 19, 2004

(65) Prior Publication Data

US 2005/0078379 A1    Apr. 14, 2005

Related U.S. Application Data

(63) Continuation-in-part of application No. 10/366,296, filed on Feb. 12, 2003, now Pat. No. 6,885,494.

(51) Int. Cl.
*G02B 26/00* (2006.01)
*G03B 21/00* (2006.01)
*G03B 21/14* (2006.01)
*G03B 27/54* (2006.01)

(52) U.S. Cl. ............. 359/290; 359/291; 359/295; 353/20; 353/31; 353/99; 355/67

(58) Field of Classification Search ........ 359/290–293, 359/295, 298, 223, 224, 214, 226, 618; 353/20, 353/31, 34, 99; 348/760, 744, 771; 355/67
See application file for complete search history.

(56) References Cited

U.S. PATENT DOCUMENTS

| | | | | |
|---|---|---|---|---|
| 5,768,009 A | * | 6/1998 | Little | 359/293 |
| 5,926,309 A | * | 7/1999 | Little | 359/293 |
| 5,943,157 A | * | 8/1999 | Florence et al. | 359/290 |
| 6,038,056 A | * | 3/2000 | Florence et al. | 359/290 |
| 6,585,378 B1 | * | 7/2003 | Kurtz et al. | 353/31 |
| 6,676,260 B1 | * | 1/2004 | Cobb et al. | 353/31 |
| 6,819,470 B1 | * | 11/2004 | Meier et al. | 359/291 |
| 6,867,897 B1 | * | 3/2005 | Patel et al. | 359/291 |
| 6,896,371 B1 | * | 5/2005 | Shimizu et al. | 353/31 |
| 6,980,280 B1 | * | 12/2005 | Roddy et al. | 355/67 |

* cited by examiner

*Primary Examiner*—Loha Ben
(74) *Attorney, Agent, or Firm*—Gregory R. Muir

(57) ABSTRACT

Disclosed herein is a micromirror-based display system having an improved contrast ratio with the deflection of the micromirrors accomplished through one addressing electrode associate with the micromirror.

79 Claims, 9 Drawing Sheets

DISPLAY APPARATUS WITH IMPROVED CONTRAST RATIO

CROSS-REFERENCE TO RELATED APPLICATIONS

This is a continuation-in-part of a U.S. patent application Ser. No. 10/366,296 filed Feb. 12, 2003, now U.S. Pat. No. 6,885,494, the subject matter being incorporated herein by reference in its entirety.

TECHNICAL FIELD OF THE INVENTION

The present invention is related generally to display systems, and, more particularly, to micromirror-based display systems.

BACKGROUND OF THE INVENTION

The ratio of luminance between the brightest white in a display system to the darkest black that can be produced is called the contrast ratio. In a micromirror based display system, higher contrast ratios can be achieved when there is a larger difference in angle between light reflected from the mirrors in their ON state and light reflected from the mirror in the OFF state. One way to increase the difference in reflected angles is by having the micromirrors be electrostatically deflected in opposite directions (to ON and OFF states) from a non-deflected state.

Micromirror based display systems that have only a single addressing electrode per micromirror often deflect the micromirror to an ON state, but leave the micromirror undeflected in the OFF state (or deflect minimally the micromirror in the OFF state). This results in a decrease in the difference in angle of the light reflected in the ON state vs. the OFF state, thus decreasing contrast ratio. Therefore, what is needed for such single addressing electrode systems, is higher contrast ratio.

SUMMARY OF THE INVENTION

In view of the foregoing, the present invention provides a display system employing a spatial light modulator having an array of deflectable reflective micromirrors with improved contrast ratio. The objects and advantages of the present invention will be obvious, and in part appear hereafter and are accomplished by the present invention. Such objects of the invention are achieved in the features of the independent claims attached hereto. Preferred embodiments are characterized in the dependent claims.

One aspect of the invention is improving the contrast ratio of a micromirror based display system by providing the display system with an array of micromirrors each of which can be switched between an ON and OFF state angle by one addressing electrode, wherein the difference between the ON and OFF state angle is from 12° degrees to 22° degrees such that the contrast ratio of the display system can be 1200:1 or higher.

Another aspect of the invention is improving the contrast ratio of a micromirror based display system by providing the display system with an array of micromirrors, each of which can be switched between an ON and OFF state angle by one addressing electrode, and wherein the ON state angle is 14° or higher.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 7b shows a bottom view of the hinge support in the micromirror of FIG. 7a;

FIG. 12b illustrates a top view of a portion of an array of addressing electrodes and circuitry for addressing the micromirrors of the micromirror array in FIG. 12a;

DETAILED DESCRIPTION OF THE INVENTION

Figure 1:
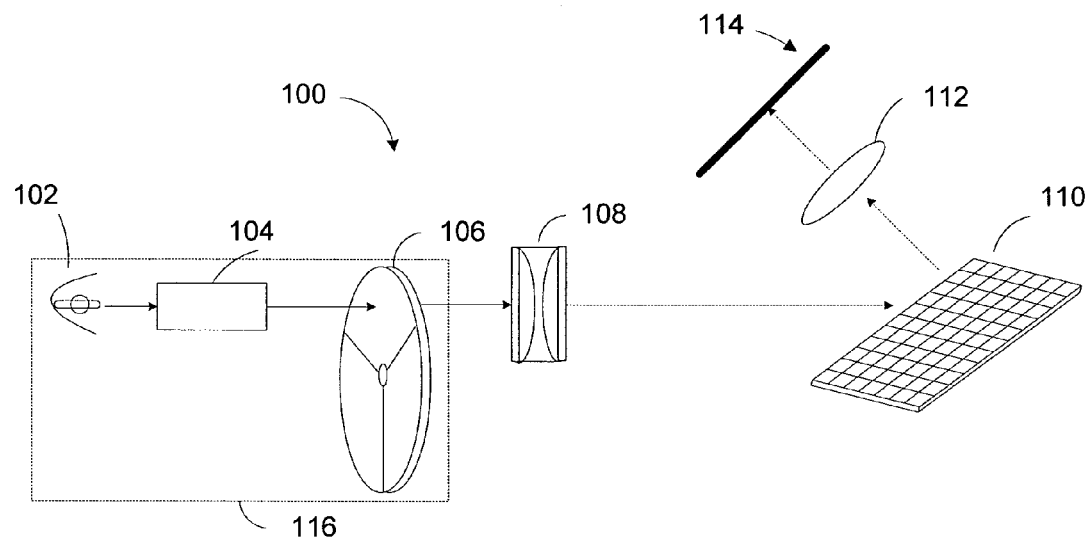
FIG. 1 demonstratively illustrates a display system in which embodiments of the invention can be implemented.

Turning to the drawings, an exemplary micromirror based display system is illustrated in FIG. 1. In its basic configuration, display system 100 comprises illumination system 116 for producing sequential color light, spatial light modulator 110, optical element 108 for directing illumination light from the illumination system onto the spatial light modulator, and optical element 112 that projects the reflected illumination light onto display target 114.

Illumination system 101 further comprises light source 102, which can be an arc lamp, lightpipe 104 that can be any suitable integrator of light or light beam shape changer, and color filter 106, which can be a color wheel. The filter in this particular example is positioned after light pipe 104 at the propagation path of the illumination light. In another example, the color filter can be positioned between the light source and light pipe 104, which is not shown in the figure.

An exemplary rear-projection system having a reduced dimension is set forth in U.S. patent application, publication No. US20040114230 to Peterson et al, filed Dec. 5, 2003, the subject matter being incorporated herein by reference. More complex display systems are also applicable, especially those having more than one spatial light modulator for color images, such as the display system in FIG. 2.

Figure 2:
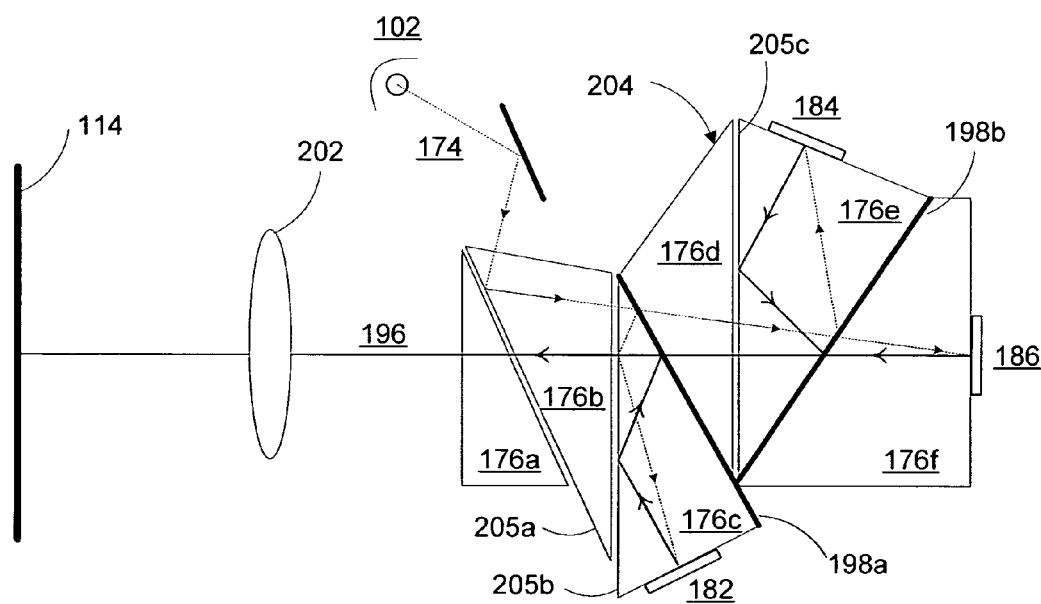
FIG. 2 demonstratively illustrates another display system in which embodiments of the invention can be implemented.

Referring to FIG. 2, another exemplary display system employing three spatial light modulators, each comprising an array of micromirrors and being designated for respectively modulating the multi-color (e.g. three color such as red, green and blue) light beams, is presented therein. The display system employs a dichroic prism assembly 204 for splitting incident light into three primary color light beams. Dichroic prism assembly comprises TIR 176a, 176c, 176d, 176e and 176f. Totally-internally-reflection (TIR) surfaces, i.e. TIR surfaces 205a, 205b and 205c, are defined at the prism surfaces that face air gaps. The surfaces 198a and 198b of prisms 176c and 176e are coated with dichroic films, yielding dichroic surfaces. In particular, dichroic surface 198a reflects green light and transmits other light. Dichroic surface 198b reflects red light and transmits other light. The three spatial light modulators, 182, 184 and 186, each having a micromirror array device, are arranged around the prism assembly.

In operation, incident white light 174 from light source 102 enters into TIR 176a and is directed towards spatial light modulator 186, which is designated for modulating the blue light component of the incident white light. At the dichroic surface 198a, the green light component of the totally internally reflected light from TIR surface 205a is separated therefrom and reflected towards spatial light modulator 182, which is designated for modulating green light. As seen, the separated green light may experience TIR by TIR surface 205b in order to illuminate spatial light modulator 182 at a desired angle. This can be accomplished by arranging the incident angle of the separated green light onto TIR surface 205b larger than the critical TIR angle of TIR surface 205b. The rest of the light components, other than the green light, of the reflected light from the TIR surface 205a pass through dichroic surface 198a and are reflected at dichroic surface 198b. Because dichroic surface 198b is designated for reflecting red light component, the red light component of the incident light onto dichroic surface 198b is thus separated and reflected onto spatial light modulator 184, which is designated for modulating red light. Finally, the blue component of the white incident light (white light 174) reaches spatial light modulator 186 and is modulated thereby. By collaborating operations of the three spatial light modulators, red, green and blue lights can be properly modulated. The modulated red, green and blue lights are recollected and delivered onto display target 114 through optic elements, such as projection lens 202, if necessary.

Figure 3:
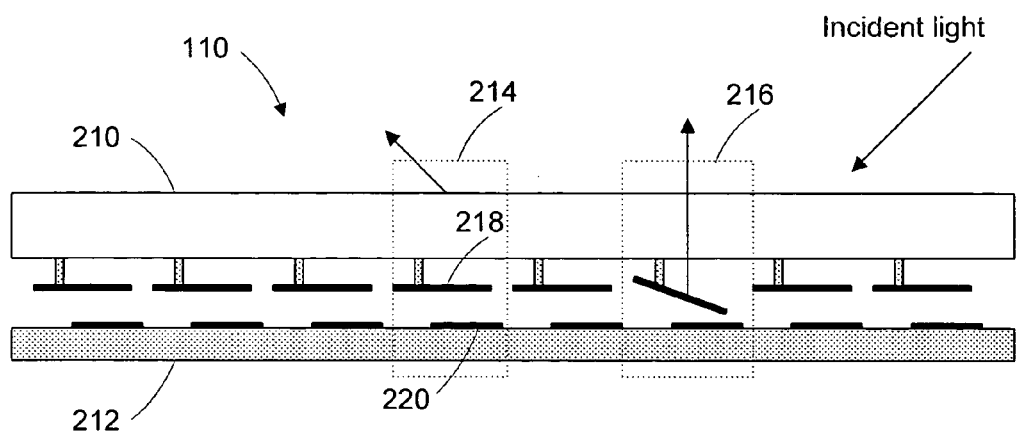
FIG. 3 is a cross-section view of the spatial light modulator for use in the display systems in FIGS. 1 and 2.

The spatial light modulator, in general, comprises an array of a hundred thousands or more, or a million or more of micromirrors, the total number of which determines the resolution of the displayed images. For example, the micromirror array of the spatial light modulator may have 1024× 768, 1280×720, 1400×1050, 1600×1200, 1920×1080, or even larger number of micromirrors. In other applications, the micromirror array may have fewer micromirrors. FIG. 3 illustrates a cross-section view of a portion of an exemplary spatial light modulator of FIG. 1 and FIG. 2. For simplicity and demonstration purposes, micro-mirrors and addressing electrodes are shown in diagrammatical sketches and only eight micromirrors and addressing electrodes are illustrated therein.

For achieving a high resolution and optical efficiency while maintaining the same dimension of the micromirror array so as to be compatible with commonly used light source, such as arc lamps which often has small arc sizes (e.g. 1.0 mm or shorter), the micromirror array preferably has certain dimensions as set forth in U.S. patent application Ser. No. 10/627,303 filed Jul. 29, 2003, now U.S. Pat. No. 6,980,347, the subject matter being incorporated herein by reference. For example, the micromirror array preferably has a pitch size of 10.16 micrometers or less or from 4.38 to 10.16 micrometers with the pitch defined as the distance between adjacent micromirrors in the micromirror array. The gap between adjacent micromirrors is preferably 0.5 micrometer or less, or from 0.15 to 0.5 micrometer.

In this particular example, spatial light modulator 110 comprises an array of micromirrors (e.g. micromirrors 214 and 216) that are individually addressable and deflectable. The micromirrors are formed on substrate 210, which is a substrate transmissive to visible light, such as glass or quartz. For deflecting the micromirrors, an array of addressing electrodes (e.g. addressing electrode 220) is formed on semiconductor substrate 132, which is placed proximate to the micromirror array such that the mirror plates of the micromirrors can be deflected in response to electrostatic forces derived from electrostatic fields that are established between the mirror plates and addressing electrodes. In accordance with an embodiment of the invention, each mirror plate of a micromirror is associated with a single addressing electrode that is connected to a voltage output of a circuitry (e.g. a memory cell) storing a voltage signal, the magnitude of which changes according to image data of the desired images. The image data, such as bitplane data, can be produced according to a pulse-width-modulation algorithm. In another embodiment, each mirror plate can be associated with another electrode, on which a bias voltage (e.g. a constant electrical voltage) can be applied during the operation.

In response to the electrostatic force, the mirror plates of the micromirrors rotate to either an ON state or an OFF state. In the ON state, the mirror plate (e.g. the mirror plate of micromirror 216) reflects the incident light into the projection lens—resulting in a bright pixel in the display target, and in the OFF state, the mirror plate (e.g. the mirror plate of micromirror 214) reflects the incident light away from the projections lens—resulting in a dark pixel in the display target. Specifically, the mirror plates rotate to the ON state due to the electrostatic forces applied thereon, while rotations of the mirror plates to the OFF state from the ON state can be accomplished through internal restoration forces established during the deformation of the hinges to which the mirror plates attached. Alternatively, rotation of the mirror plates to the OFF state can be accomplished through application of an electrostatic voltage on a substrate, such at substrate 210 on which the micromirrors are formed.

In the above example, the micromirrors are formed on light transmissive substrate 130 separate from substrate 132 on which the addressing electrodes are formed. Alternatively, the micromirrors and the addressing electrodes can be formed on the same substrate, preferably a semiconductor wafer, such as semiconductor substrate 132. In another embodiment of the invention, the micromirror substrate can be formed on a transfer substrate that is light transmissive. Specifically, the micromirror plate can be formed on the transfer substrate and then the micromirror substrate along with the transfer substrate is attached to another substrate such as a light transmissive substrate followed by removal of the transfer substrate and patterning of the micromirror substrate to form the micromirror.

According to the invention, the display system has a contrast ratio that is 1000:1 or higher, such as 1200:1 or higher, 1500:1 or even 2000:1 or higher. To achieve such contrast ratios, among other things, the micromirrors are made such that the reflected light from the mirror plates at the ON and OFF states are separated as far away as possible, or at least not mixed. Degradation of the contrast ratio due to mixture of the reflected light from the mirror plates at the ON and OFF state can thus be avoided or suppressed.

For example, when the mirror plates can only be deflected at small angles for the ON state, the angle between the vertical direction along which the projection lens is disposed and the reflected light from the mirror plate at the OFF state (e.g. the non-deflected state) is small. Part of the reflected light from the mirror plate at the OFF state may travel through the projection lens and mix with the reflected light from the mirror plate at the ON state. This situation is deteriorated when the incident light has finite size and opens a solid angle toward the micromirrors. Accordingly, the desired dark pixels will not be as dark as they should be. Accordingly, the contrast ratio of the produced images is poor.

To solve this problem, the present invention provides a micro-mirror that can be deflected at large angles such that the reflected light from the non-deflected and deflected states are safely separated, even if only one addressing electrode is provided per micromirror. An exemplary micro-mirror according to an embodiment of the invention is illustrated in FIG. 4a.

Figure 4A:
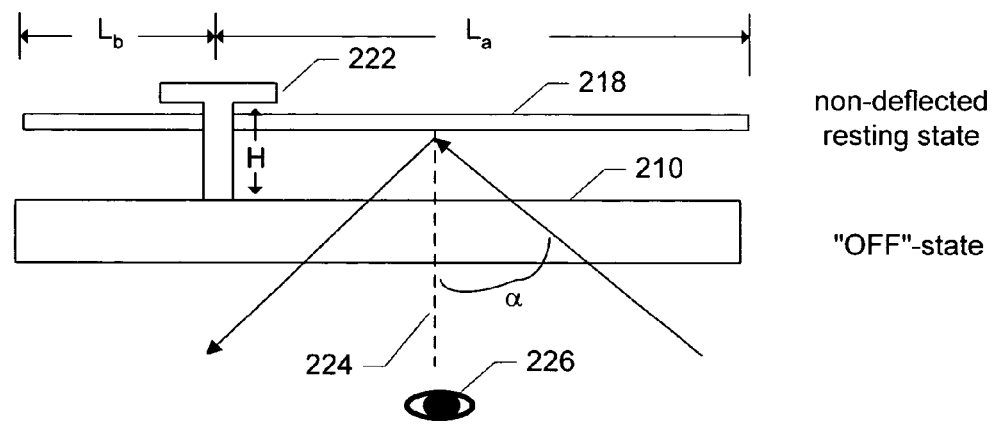
FIG. 4a schematically illustrates a cross-section view of a micromirror at an OFF state in the spatial light modulator of FIG. 3.

Referring to FIG. 4a, an exemplary micromirror (e.g. micromirror 214) of the micromirror array in FIG. 3 is illustrated therein. The basic configuration of the micromirror comprises substrate 210, hinge posts 222, a deformable hinge that is held by the posts and is hidden under deflectable and reflective mirror plate 218 for reducing undesired light scattering. In accordance with an embodiment of the invention, the hinge and the mirror plate are not on the same plane parallel to the substrate when the mirror plate is not deflected. Of course, other configurations, such as forming the mirror plate and hinge on the same plane, or forming the hinge such that the hinge is exposed to the incident light are also applicable, which will not be discussed in detail herein.

The mirror plate is attached to the deformable hinge such that the mirror plate extends a greater distance from the hinge on one side of the hinge than on the other side of the hinge. For example, the distance $L_b$ measured from the left end of the mirror plate to the hinge is less than the distance $L_a$ measured from the right end of the mirror plate to the hinge. This asymmetric configuration enables the mirror plate rotating relative to the substrate by the hinge at much larger angles. Reflected light from different operational states that are defined in accordance with rotational positions (angles) of the mirror plate can thus be well separated. In this way, the contrast ratio of a displayed image by the micromirror can be improved.

Figure 4B:
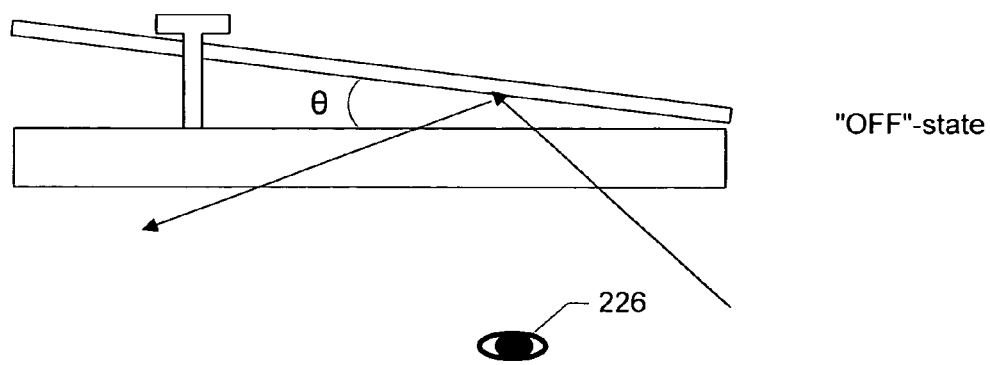
FIG. 4b schematically illustrates a cross-section view of a micromirror at another OFF state in the spatial light modulator of FIG. 3.

In operation, binary operation states, such as the ON and OFF states, are defined for the micromirror according to the rotation status of the mirror plate and the relative position of the target (e.g. a screen or a viewer's eyes). For example, the OFF state can be the non-deflected resting state as the mirror plate is positioned parallel to the substrate as shown in FIG. 4a. The OFF state can also be defined as the longer portion (e.g. $L_a$) of the mirror plate being rotated toward the substrate and making an angle (represented by θ) with the substrate as shown in FIG. 4b. The angle θ can be from 0.5° to 7° degrees, preferably from 1° to 9°, or from 1° to 4° degrees, (at least 2° degrees is preferred in many cases).

Figure 4C:
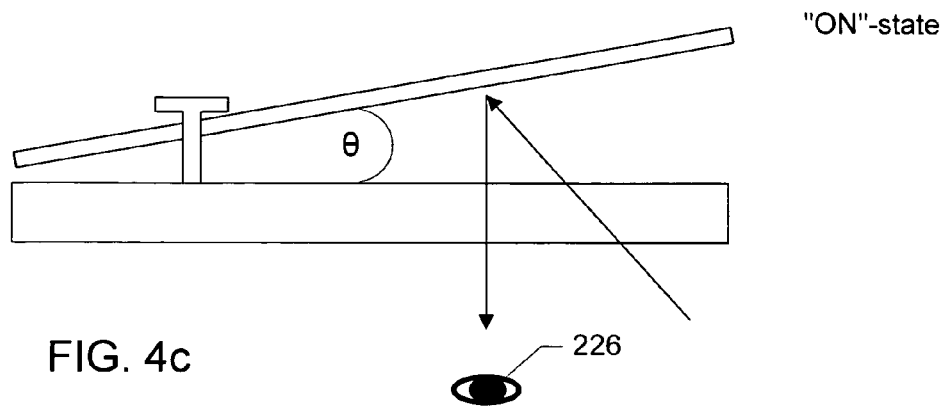
FIG. 4c schematically illustrates a cross-section view of a micromirror at an ON state in the spatial light modulator of FIG. 3.

The ON state can be defined as the shorter portion (e.g. $L_b$) of the mirror plate being rotated toward the substrate and making an angle θ with the substrate as shown in FIG. 4c. The maximum value of θ can be approximated as: $\theta \approx \sin^{-1}(H/L_b)$, wherein H being the height of the hinge on the hinge posts relative to the substrate. The expression implies that θ increases with decreasing $L_b$, given that the height (H) of the hinge is fixed. For example, by adjusting $L_b$, 12° (twelve degrees) or more, such as 14° (fourteen degrees) or more, and preferably from 15° (fifteen degrees) to 27° (twenty seven degrees)—with improved performance achieved at from 17.5° (seventeen and a half degrees) to 22.5° (twenty two and a half degrees), with best performance at around 20° (twenty degrees), a higher contrast ratio can be achieved.

In accordance with an embodiment of the invention, the ON state angle can be from 14° degrees to 16° degrees, while the OFF state angle is from −1° degrees to −6° degrees. The difference between the ON and OFF state angles is from 12° to 18° degrees, or from 16° to 22° degrees, or from 22° to 23° degrees.

In a projection system, such as those illustrated in FIGS. 1 and 2, separation of the reflected light cones from the ON and OFF states can be further improved by providing the optical elements with suitable optical parameters. For example, it is advantageous to use a condensing lens (e.g. condensing lens 108 in FIG. 1) and a projection lens (e.g. projection lens 112 in FIG. 1 and condensing lens 202 in FIG. 2) with small f-numbers that is defined as the ratio of the focal length to the dimension of the lens. In an example of the invention, the f-numbers of the optical elements, such as the condensing and projection lens are preferably from f/1.8 to f/4, with f being the focal length.

For improving the contrast ratio by enhancing the reflectivity of the mirror plate to the incident illumination light to be modulated, the mirror plate has a reflecting surface with the reflectivity to the incident illumination of 85% or higher, such as 95% or higher, or 97% or higher. This can be achieved by coating the reflecting surface with a proper light reflecting material, which is preferably a suitable metallic material, such as aluminum, silver, or gold. Moreover, the surfaces of the light transmissive substrate, such as substrate 210 in FIG. 3, are preferably coated with one or more optical materials (e.g. an antireflection coating) that enhance the transmission of the incident illumination light.

For securing a uniform reflection of the incident light without introducing undesired light scattering from the reflecting surface of the mirror plate, it is preferred that the reflecting surface is substantially perfectly smooth. Specifically, the standard deviation of the surface roughness is preferably 0.1% or less, such as 0.01% or less.

Although it is advantageous to have a smooth reflecting surface of the mirror plate, the mirror plate, especially the reflecting surface preferably has limited negative curvature so as to improve the contrast ratio. Specifically, the reflecting surface is flat or curved with its edges towards the addressing electrode associated therewith, and the center of the reflecting surface away from the addressing electrode. The curvature is preferably less than 2.5 mm$^{-1}$, and more preferably less than 1 mm$^{-1}$.

Figure 5:
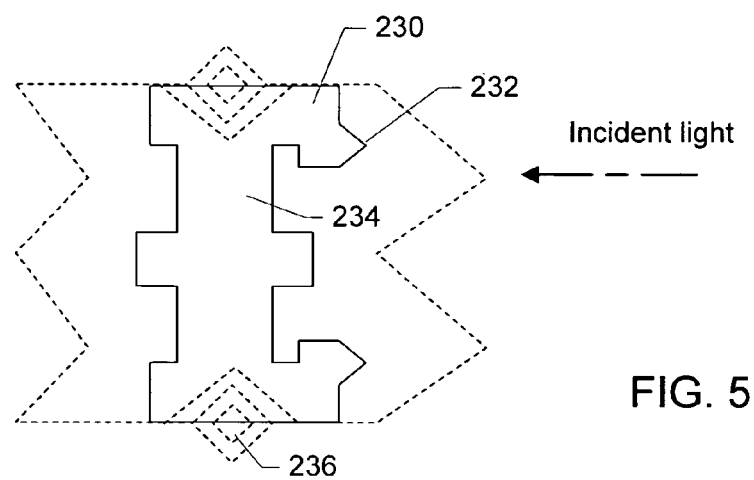
FIG. 5 shows a top view of an exemplary micromirror.

The high rotation angle design can be implemented in a variety of micromirrors, such as a micromirror whose top view is illustrated in FIG. 5. Referring to FIG. 5, mirror plate 218, which comprises zigzagged edges is attached to deformable hinge 234 that is held by posts 236 on a substrate, such as a substrate transmissive to visible light. In operation, the illumination light is incident towards the zigzagged edges such that the illumination light is not perpendicular to an edge of the mirror plate so as to reduce undesired light scattering, as shown in the figure. Other features, such as stopper 232 for limiting the rotation of the mirror plate when the mirror plate rotates to a desired angle (e.g. the ON state) can be provided. A simplified version of this micromirror is illustrated in the perspective view as illustrated in FIG. 6.

Figure 6:
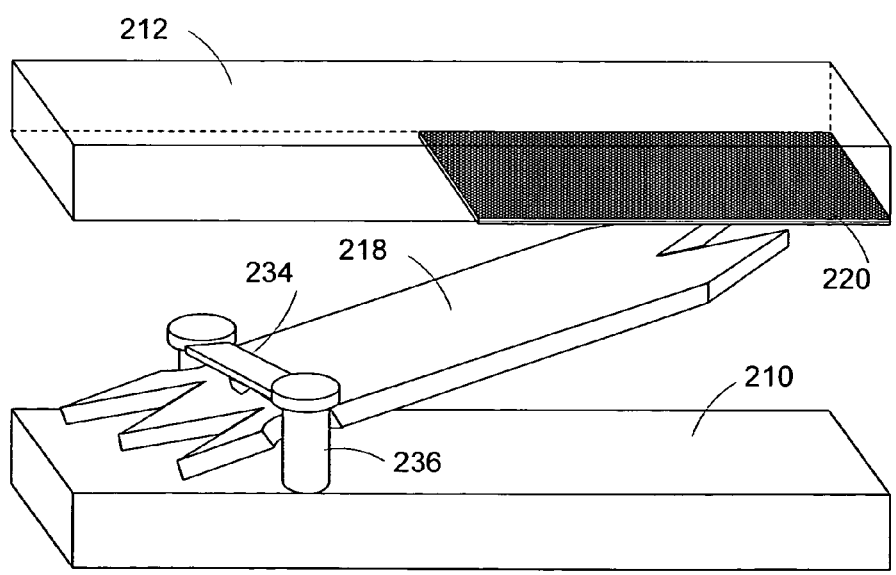
FIG. 6 illustrates a perspective view of a micromirror device having the micromirror in FIG. 5.

Referring to FIG. 6, mirror plate 218 is attached to deformable hinge 234 with one end of the mirror plate extending a greater distance from the hinge than the other. The mirror plate is operable to rotate to a larger angle, such as the ON state angle in one direction than the achievable angle, such as the OFF state angle in the opposite direction. For rotating the mirror plate, addressing electrode 220 formed on semiconductor substrate 212 is associated with the mirror plate and disposed proximate to the mirror plate.

Figure 7A:
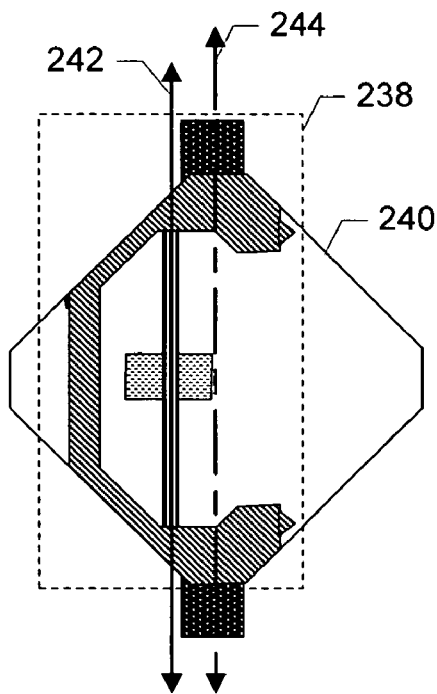
FIG. 7a illustrates a bottom view of another exemplar micromirror.

The large rotation angle can also be implemented in many other micromirrors, such as that shown in FIG. 7a. Referring to FIG. 7a, a bottom view of the micromirror is illustrated therein. Mirror plate 240 in this particular example, is substantially square, or rectangular with well defined diagonals. The mirror plate has a reflecting surface for effectively reflecting the incident visible light. The mirror plate is attached to a deformable hinge that is held by hinge support 238 such that rotation axis 242 of the mirror plate is parallel to but offset from diagonal 244 of the mirror plate. In this way, the mirror plate is operable to rotate to a larger angle (e.g. the ON state angle) in one direction than the angle (e.g. the OFF state angle) in the opposite direction. The hinge support is better illustrated in FIG. 7b.

Figure 7B:
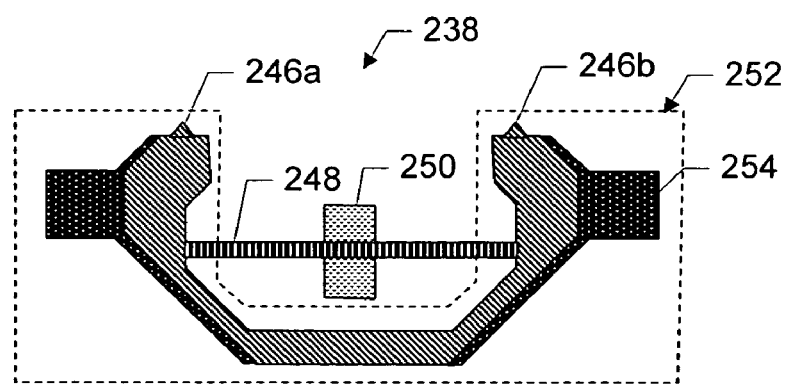

Referring to FIG. 7b, the mirror plate (not shown in this figure) is attached to hinge 248 via hinge contact 250 with the hinge contact at a location not at the center of the mirror plate. The deformable hinge is affixed to hinge support at two opposite ends. The hinge support is held on the substrate by posts 254.

In the above example as shown in FIGS. 7a and 7b, the hinge is disposed underneath the mirror plate with respect to the propagation direction of the incident light. That is, the hinge is located on the side of the mirror plate opposite to the reflecting surface of the mirror plate. Undesired light scattering from the hinge and hinge support can be suppressed or avoided. It is also advantageous in achieving a larger On state angle, thus larger separation of the ON and OFF states, to reduce the distance between the deformable hinge and the mirror plate, as set forth in U.S. patent application Ser. No. 10/627,303 to Patel et al, filed Jul. 24, 2003, now U.S. Pat. No. 6,980,347, the subject matter being incorporated herein by reference. In particular, the distance between the mirror plate and deformable hinge is less than 0.45 micron, such as from 0.15 to 0.45 micron. Other features, such as stopping mechanisms 246a and 246b can be formed, for example, on the hinge support or at other locations. In fact, the substrate on which the micromirror is formed may act as a stopping mechanism for limiting the rotation of the mirror plate when the mirror plate reaches a desired rotation angel, such as the ON state angle.

When mapping individual micromirrors, such as the micromirrors in FIGS. 5 and 7, into a micromirror array of a spatial light modulator, different arrangements may result in different contrast ratios of the same display system. For example, a micromirror array having large gaps between adjacent micromirrors may have a poor contrast ratio due to the introduction of extra light scattering from the components located underneath the gaps. On the other hand, because the micromirrors are often periodically arranged within the micromirror array, the gaps between the adjacent micromirrors are also periodically disposed across the micromirror array. When the gap sizes, as well as the periodicity of the gaps' locations match the wavelength of the incident light, undesired diffraction pattern may be produced by the gaps. This diffraction pattern overlaps with the desired images and changes the illumination pattern of the desired image.

In order to reduce the light scattering introduced by the openings of gaps without generating undesired diffraction patterns, the micromirrors of the spatial light modulator are arranged with selected gap sizes, which will be discussed with reference to FIGS. 8 and 9.

Figure 8:
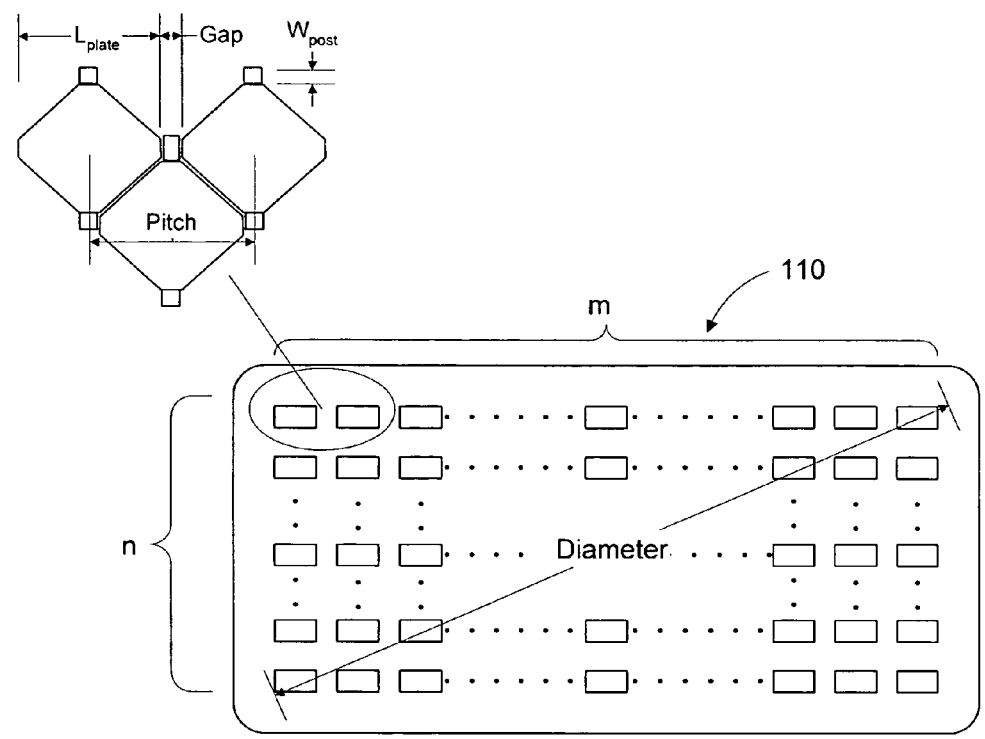
FIG. 8 demonstratively illustrates a top view of an array of micromirrors in the spatial light modulator of FIGS. 1 and 2.
Figure 9:
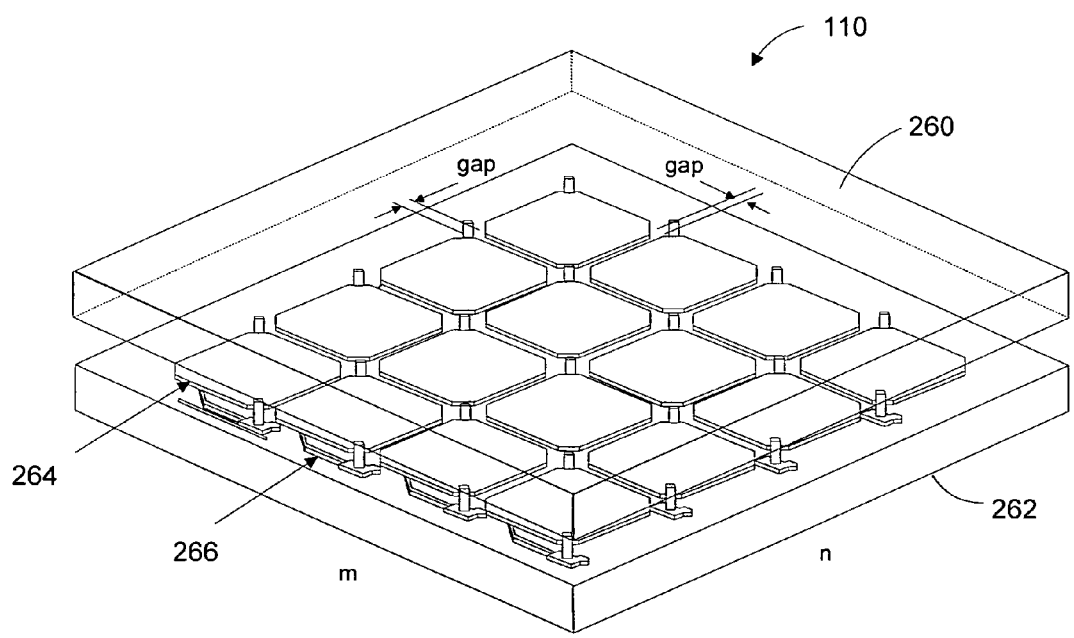
FIG. 9 is a perspective view of a portion of an exemplar micromirror array in a spatial light modulator.

Referring to FIG. 8, spatial light modulator 110 comprises an array of micromirrors that has m×n micromirrors, wherein m and n respectively represent the number of micromirror devices in a row and a column of the array. The micromirror array also has a well defined diagonal, which is generally measured in inches. As shown in the insert figure, a gap and pitch is defined by two adjacent micromirrors. $L_{plate}$ measures the size of the micromirror, and $W_{post}$ measures the post area of the micromirror. The post area is the area in which posts for holding the mirror plate are formed. Though the insert figure illustrates the dimensions of the micromirror and the adjacent micromirrors with the micromirror of rectangular shape, those dimension definitions are applicable to any micromirrors and micromirror arrays. A perspective view of the spatial light modulator in FIG. 8 is illustrated in FIG. 9. For demonstration and simplicity purposes, only 4×4 micromirrors are presented in the figure. As shown in the figure, spatial light modulator 110 comprises micromirror array 264 formed on substrate 260 that is transmissive to visible light. For individually deflecting the micromirrors, each micromirror is associated with an addressing electrode, preferably only one addressing electrode of addressing electrode array 266 that is formed on substrate 262.

The gap determines the fill factor of the micromirror array device, wherein the fill factor is defined as the ratio of the total area of the mirror plates of the micromirrors to the area of the micromirror array. For example, the fill factor can be calculated by: the area of a micromirror plate of the micromirror divided by the pitch squared, provided that the mirror plates of the micromirrors are identical and the pitch size is uniform over the entire micromirror array. In an embodiment of the invention, the fill factor of the micromirror array device is 85% or higher, and more preferably, 90% or higher.

According to an embodiment of the invention, the gap between the adjacent micromirrors in the micromirror array can be 0.5 micrometers or less, and in other embodiments the gap is from 0.1 to 0.45 micrometer, or from 0.25 to 0.35 micrometers. The pitch can be from 4.38 to 10.6 microns; or from 5 to 9 microns; or from 6 to 8 microns, as set forth in U.S. patent applications Ser. No. 10/627,302 and Ser. No. 10/627,155, now U.S. Pat. Nos. 6,965,468 and 7,019,376, respectively, both to Huibers and filed Jul. 24, 2003, the subject matter of each being incorporated herein by reference. The pitch of the pixel subset may also have other values, such as values higher than 10.6 microns.

Figure 10A:
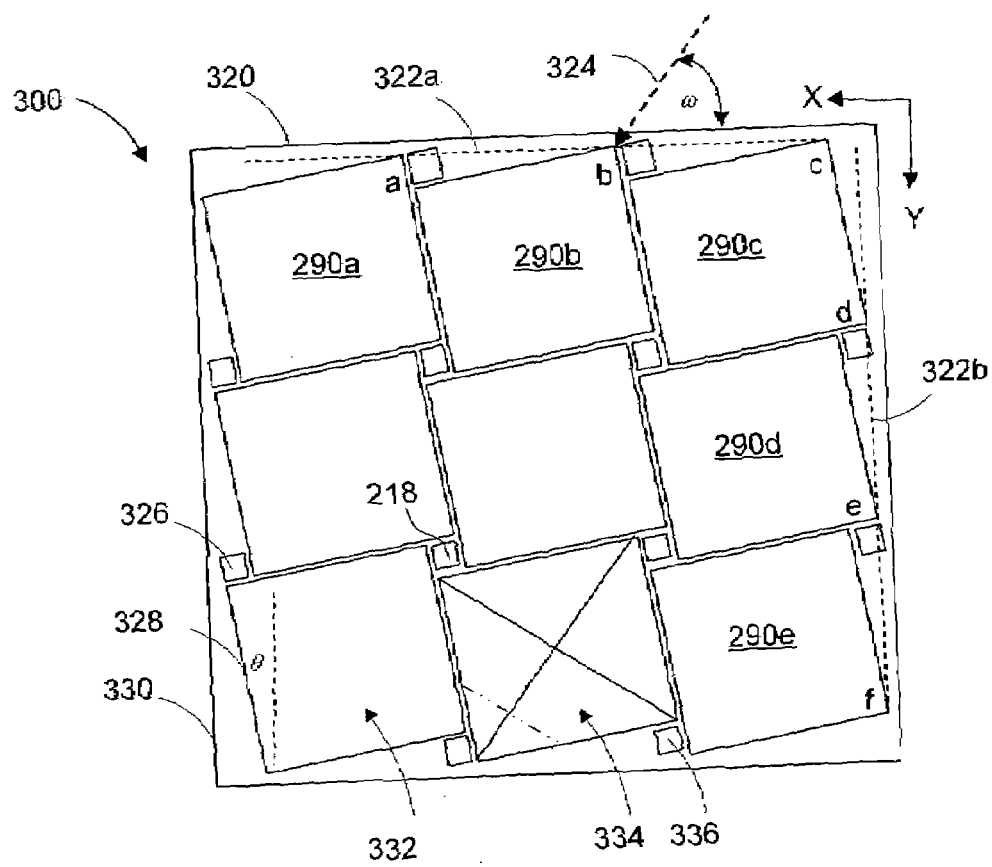
FIG. 10a and FIG. 10b are top views of a portion of another exemplar micromirror array in a spatial light modulator.

The contrast ratio can be further improved by positioning the posts of each micromirror along the sides, instead of the opposite corners of the mirror plate, as shown in FIG. 10a. Referring to FIG. 10a, each mirror plate (e.g. mirror plate 334) has four predominant sides and is held by posts 336 and 337. A four sided mirror plate is advantageous in for example "tilting" the mirror plates of the micromirrors in the array together so as to minimize gaps and other non-reflective areas therebetween. The four predominant sides define two diagonals, such as the diagonals plotted in solid lines in micromirror 334. A line between the centers of any two of the plurality of posts, such as a line between the centers of posts 336 and 337 in micromirror 334 is not coincident with either of the two diagonals. This is due to the fact that the posts that hingedly support the mirror plates are not at the direct corners of the micromirrors. By having the micromirrors "skewed" such that the posts are not at the direct corners of the mirror plats, both the mirror plates and posts can be "tilted" with maximum effect (minimizing non-reflecting areas).

In another way of describing this arrangement of the invention, the centers of the micromirrors in each row (the micromirrors disposed along the X-direction) are connected with an imaginary line, and the imaginary lines for all rows form a set of parallel imaginary lines along the X-direction. The centers of the micromirrors in each column (the micromirrors disposed along the Y-direction) are connected with another imaginary line, and all such imaginary lines form sets of parallel imaginary lines along the Y-direction. The imaginary lines along the X-direction are orthogonal to the imaginary lines along the Y-direction, and all imaginary lines form an orthogonal grid. Each one of the four predominant edges of each micromirror, however, is not parallel to an imaginary line of the grid.

Figure 10B:
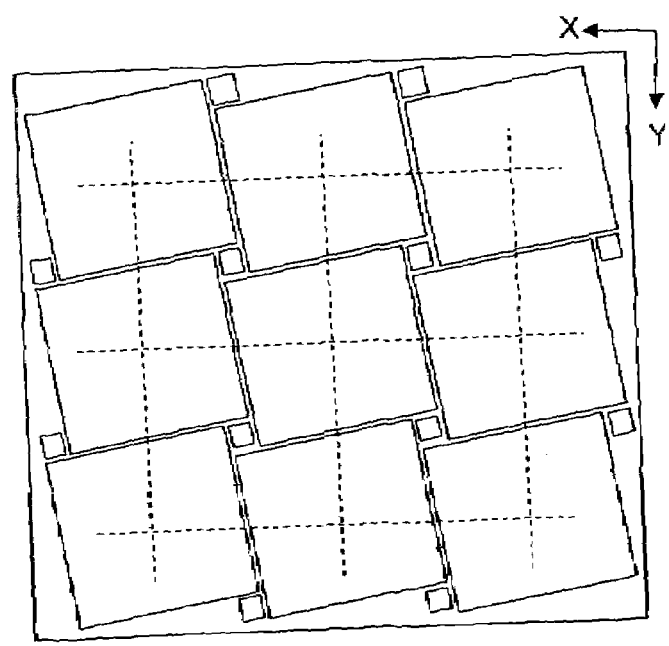

In accordance with another embodiment of the invention, spatial light modulator 300, the micromirror array is rectangular in shape as illustrated in FIGS. 10a and 10b. By "rectangular micromirror array", it is meant that a line (e.g. dotted line 322a in FIG. 10a) connecting all equivalent points (e.g. points a, b and c in FIG. 10a) of the micromirrors (e.g. micromirrors 290a, 290b and 290c) along the X direction (e.g. the X-direction in the X-Y Cartesian coordinate system illustrated in FIG. 10a) is perpendicular or substantially perpendicular to a line (e.g. dotted line 322b) connecting all equivalent points (e.g. points d, e and f) of the micromirrors (e.g. micromirrors 290c, 290d and 290e) along the Y direction of the X-Y Cartesian coordinate system. Each micromirror has four predominant sides, wherein each side is neither parallel nor perpendicular to the edges of the rectangular micromirror array. For example, edge 328 of micromirror 332 has an angle θ with the edge of the micromirror array, wherein the angle θ is neither 0° nor (n·90)° (n is an integer number) degrees. In the present invention, the angle θ can be an angle from 2° to 30°, though more likely within the range of from 5° to 25° degrees, (e.g. from 10° to 20° degrees, or around 15° degrees).

Angle θ relates to the ratio of the width of the mirror plate to the width of the post. For example, assuming both of the post and mirror plate are square, angle θ can then be written as: $ctg\theta = (m/p-1)$, wherein m is the width of the mirror plate and p is the width of the post. Corresponding to the preferred range of angle θ from 2° to 30°, the ratio of m/p ranges from 0.7 to 27.6.

In operation, incident light beam 324 has an angle φ relative to the micromirror array plane, and the angle between the projection of the incident light on the micromirror array plane and the edge (e.g. edge 210) of the micromirror array is represented by ω, as shown in the figure. The incident angle φ is preferably from 50° to 70° degrees. Angle ω relative to edge 320 of the micromirror array is preferably from 50° to 65° degrees.

Figure 10C:
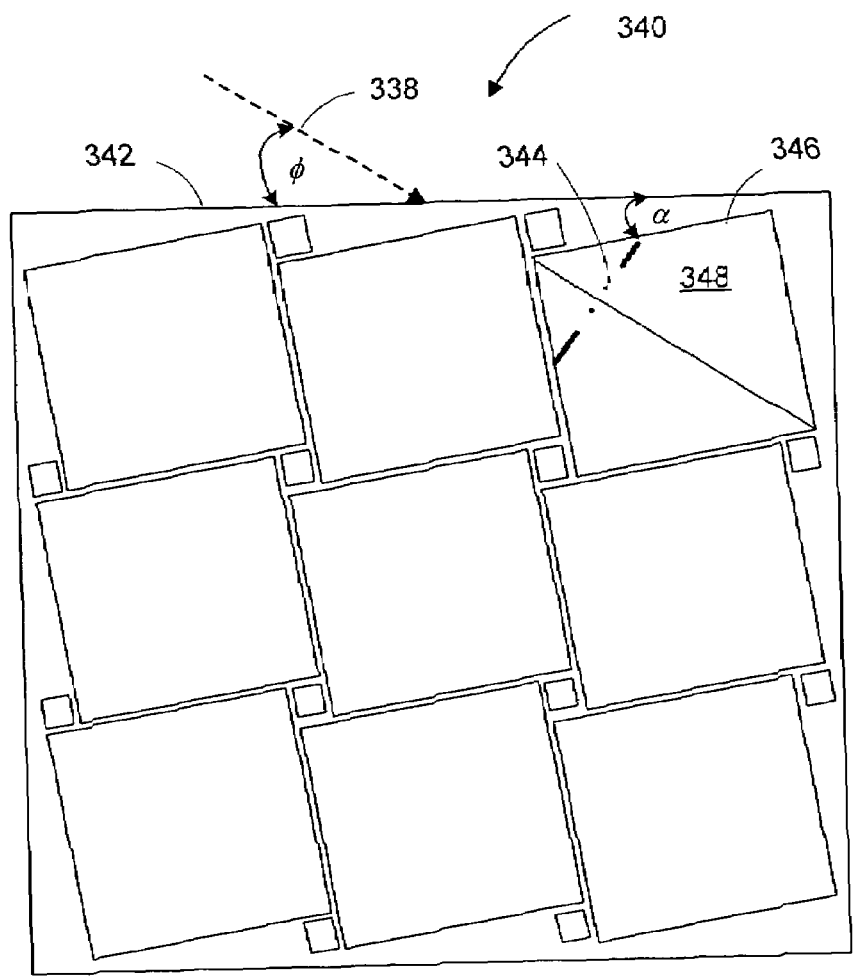
FIG. 10c is a top views of a portion of another exemplar micromirror array in a spatial light modulator.
Figure 10D:
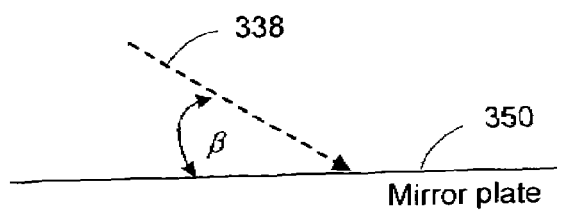
FIG. 10d illustrates the incident angle of the illumination light to the reflecting surface of the mirror plate.

FIG. 10c illustrates another exemplary micromirror array that can be used for the spatial light modulator in the display systems, as those shown in FIGS. 1 and 2. Each micromirror of the micromirror array is tilted along an axis passing through its geometric center and perpendicular to the reflecting surface of the mirror plate, resulting in angle α between an edge of the mirror plate and the edge of the micromirror array, such as angle α between mirror plate edge 346 and edge 342 of the micromirror array. In operation, illumination light 338 is directed along the diagonal of the mirror plate, presenting angle φ between the edge (e.g. edge 320) of the micromirror array and the projection of the incident light on the reflecting surface of the mirror plate. Angle β between the illumination light and the reflecting surface (e.g. reflecting surface 350) of the mirror plate is illustrated in FIG. 10d.

As a way of example, angle α can be from 5° to 30° degrees, such as from 10° degrees to 20° degrees, preferably around 12° degrees. Angle φ can be from 20° to 50° degrees, preferably around 33° degrees. Angle β is preferably determined upon the ON state angle $\theta_{ON}$ of the mirror plate in operation, which is preferably equal to $(90°-2\times\theta_{ON})$. For example, when $\theta_{ON}$ is 16° degrees, angle β is preferably 58° degrees.

Figure 11:
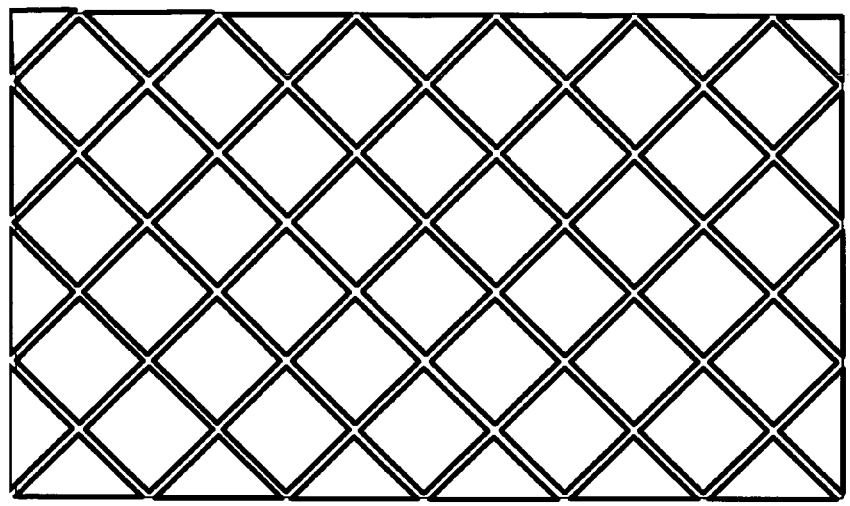
FIG. 11 is a top view of a portion of yet another exemplar micromirror array in a spatial light modulator.

FIG. 11 illustrates another exemplary micromirror array of a spatial light modulator. In this example, each micromirror is rotated 45 degrees along an axis normal to the reflecting surface and passing through the geometric center of the mirror plate, as set forth in U.S. patent applications, Ser. No. 10/857,132; Ser. No. 10/857,514; Ser. No. 10/856,174, now U.S. Pat. No. 7,018,152; Ser. No. 10/857,055 now U.S. Pat. No. 7,006,275; Ser. No. 10/857,133, now U.S. Pat. No. 7,012,731; Ser. No. 10/857,519; Ser. No. 10/857,058, now U.S. Pat. No. 7,023,606; and Ser. No. 10/857,059, both filed May 28, 2004, each of which is a continuation of U.S. Pat. Ser. No. 10/343,307 filed Jan. 29, 2003, (now U.S. Pat. No. 6,962,419), which is US National Phase of PCT/US01/24332 filed Aug. 3, 2001, which claims priority from Ser. No. 09/631,536 filed Aug. 3, 2000 (now U.S. Pat. No. 6,529,310) and Ser. No. 60/229,246 filed Aug. 30, 2000, and Ser. No. 09/732,445 filed Dec. 07, 2000 (now U.S. Pat. No. 6,523,961), the subject matter of each being incorporated herein by reference.

Figure 12A:
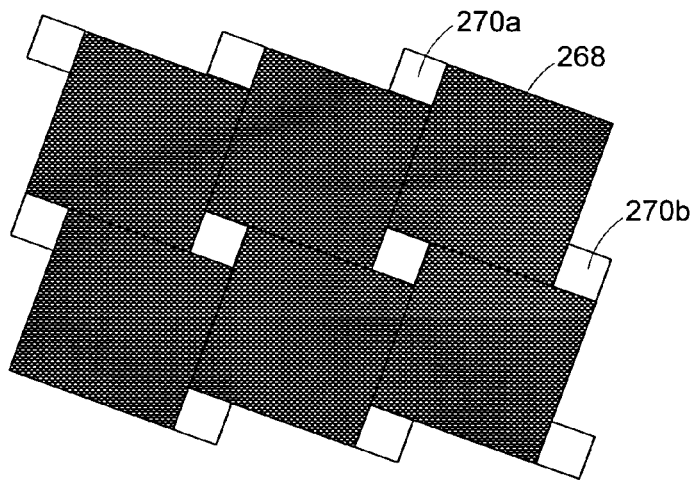
FIG. 12a illustrates a top view of a portion of an array of micromirrors usable in the spatial light modulator.
Figure 12B:
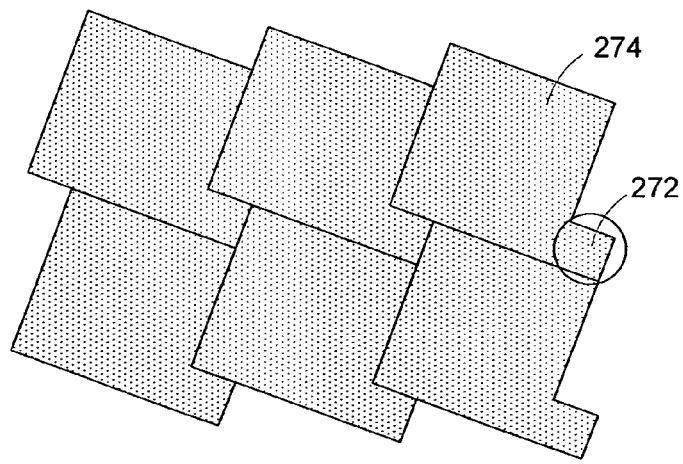
Figure 13:
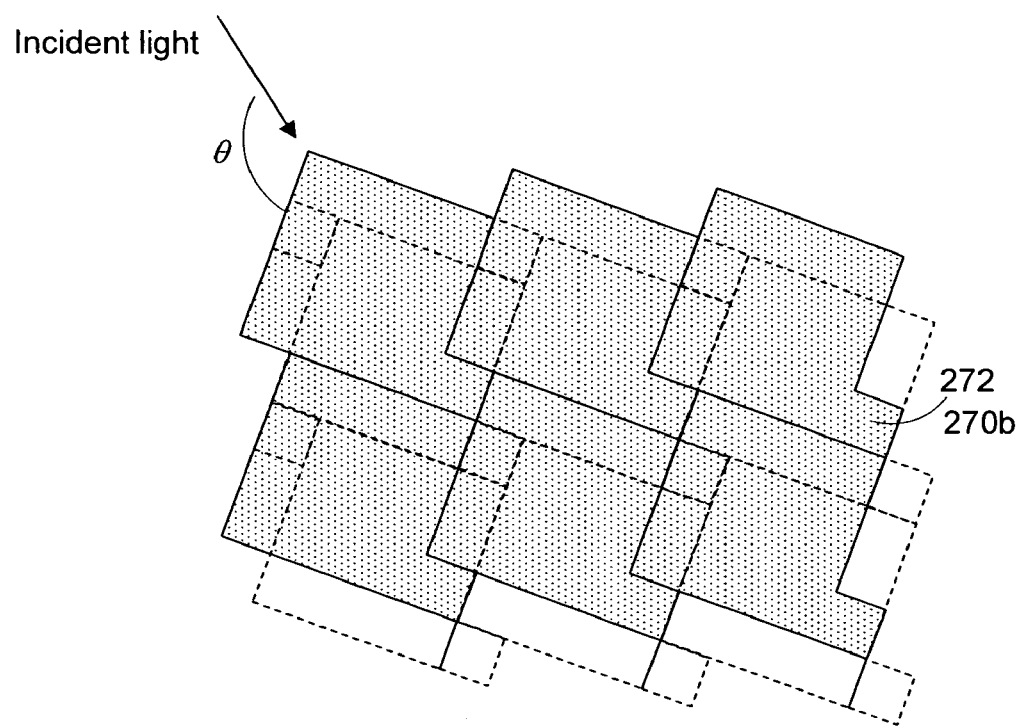
FIG. 13 illustrates a top view of an assembly having the micromirror array in FIG. 12a and the addressing electrode array in FIG. 12b.

According to another embodiment of the invention, a micromirror array device having an array of addressing electrodes and an array of micromirrors is disclosed, wherein the mirror plates of the micromirrors in the array form a plurality of pockets, in which posts can be formed, and the pockets are covered by the extended areas of the addressing electrodes when viewed from the top of the micromirror array device, as shown in FIGS. 12a to 13.

Referring to FIG. 12a, a portion of an array of mirror plates of the micromirrors is illustrated therein. The mirror plates in the array form a plurality of pockets in between. For example, pockets 270a and 270b are formed in which posts for supporting and holding mirror plate 268 can be formed. For individually addressing and deflecting the mirror plates in FIG. 12a, an array of addressing electrodes is provided, a portion of which is illustrated in FIG. 12b.

Referring to FIG. 12b, each addressing electrode has an extended portion, such as extended portion 272 of addressing electrode 274. Without the extended portion, the addressing electrode can be generally square, but having a smaller area than the mirror plate.

FIG. 13 illustrates a top view of a micromirror array device after the addressing electrodes in FIG. 12b and the mirror plates in FIG. 12a being assembled together. It can be seen in the figure that each addressing electrode is displaced a particular distance along a diagonal of the mirror plate associated with the addressing electrode. As a result, the pockets presented between the mirror plates are covered by the addressing electrode, specifically by the extended portions of the addressing electrodes. In this way, light scattering otherwise occurred in the substrate having the addressing electrodes can be removed. The quality, such as the contrast ratio of the displayed images can be improved.

Figure 14:
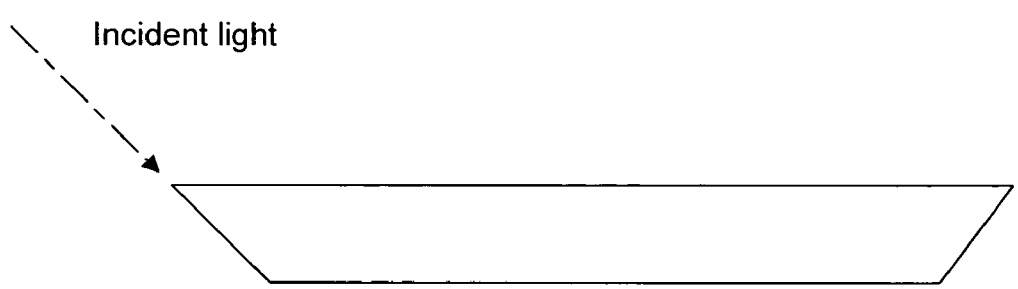
FIG. 14 is a side view of an exemplary mirror plate having tapered side edged.

For further improving the contrast ratio by reducing the undesired light scattering, the mirror plate may have tapered side edges, as shown in FIG. 14. Referring to FIG. 14, a cross-sectional view of a mirror plate is illustrated therein. The side edges are tapered inwards such that the side edges of the mirror plate are not exposed to the incident illumination light, thereby, reducing the undesired light scattering therefrom.

In the above examples, each micromirror comprises two posts for supporting the micromirrors on the substrate. The posts, however, may also introduce undesired light scattering, which in turn reduces the contrast ratio. In accordance with another embodiment of the invention, only selected micromirrors of a spatial light modulator are provided with posts, as set forth in U.S. patent application "A micromirror array device and a method for making the same" to Patel, attorney docket number P136-US, which is filed along with the current application, the subject matter being incorporated herein by reference.

In addition to reducing the undesired light scattering using the methods as discussed above, other features may also be implemented in the micromirrors and/or the micromirror array. For example, a light blocking film can be formed on either one or both of the substrates (e.g. the substrate having the micromirrors formed thereon and the substrate having the addressing electrodes formed thereon) in a form of a continuous film, or strips, a grid or a frame or any combination thereof. When taking a shape of a grid, the light blocking film is formed such that the micromirrors (or the addressing electrodes) are located within the nets of the grid. When in a form of strip, the light blocking strips are preferably disposed in spaces between adjacent micromirrors (or addressing electrodes). The light blocking film may also be disposed on the addressing electrodes, the edges of the mirror plates, and/or the surfaces of the posts exposed to the incident light, as set forth in U.S. patent applications Ser. No. 10/305,631, now U.S. Pat. No. 6,952,301, Ser. No. 10/305,536, now U.S. Pat. No. 6,906,847, Ser. No. 10/305, 507, Ser. No. 10/305,509, both filed Nov. 26, 2002, now U.S. Pat. Nos. 6,958,846 and 6,844,959, respectively, the subject matter of each being incorporated herein by reference.

In practical applications, the micromirror arrays are generally packaged for protection, as described in U.S. patent applications Ser. No. 10/443,318 filed May 22, 2003, and Ser. No. 10/852,981 filed May 24, 2004, the subject matter of each being incorporated herein by reference. The micromirror packages are often packaged between a package substrate having a supporting surface to which the micromirror array device is attached, and a package cover, which is transmissive to visible light and is hermetically bonded to the package substrate. A light blocking film can also be deposited on the package cover, preferably in the form of a frame surrounding the micromirror array, as set forth in U.S. patent application "Light Blocking Layer in MEMS Package", attorney docket number P177-US, filed along with the present application. In particular, package cover can be slanted so as to improve the transmission of the incident light, as set forth in U.S. patent Ser. No. 10/343,307, filed Jan. 29, 2003, the subject matter being incorporated herein by reference.

It will be appreciated by those skilled in the art that a micromirror-based display system with improved contrast ratio has been described herein. In view of the many possible embodiments to which the principles of this invention may be applied, however, it should be recognized that the embodiments described herein with respect to the drawing figures are meant to be illustrative only and should not be taken as limiting the scope of invention. For example, those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

We claim:

1. A projection system, comprising:
    a light source providing illumination light for the projection system;
    a spatial light modulator comprising an array of micromirror devices, wherein each micromirror device comprises;
    a deflectable and reflective mirror plate; and
    a single addressing electrode disposed proximate to the mirror plate for receiving pulse-width-modulation data so as to deflect the mirror plate;
    an optical element for directing light onto the spatial light modulator;
    wherein the projection system has a contrast ratio of 1200:1 or more.

2. The system of claim 1, wherein the contrast ratio is 1500:1 or more.

3. The system of claim 1, wherein the contrast ratio is 2000:1 or more.

4. The system of claim 1, further comprising:
    a color filter and a lightpipe.

5. The system of claim 4, wherein the color filter is positioned between the light source and lightpipe.

6. The system of claim 4, wherein the color filter is positioned after the light source and lightpipe at a propagation path of illumination light from the light source.

7. The system of claim 1, wherein the mirror plate is operable to rotate to an ON state angle in response to an electrostatic field between the mirror plate and addressing electrode; but rotate to an OFF state angle under a mechanical restoration force in a deformnable hinge of the micromirror.

8. The system of claim 7, wherein the ON state angle is from 14° to 20° relative to a substrate on which the micromirror is formed.

9. The system of claim 7, wherein the OFF state angle is from −1° to −6° relative to a substrate on which the micromirror is formed.

10. The system of claim 7, wherein a difference between the ON and OFF state angles is from 12° to 18°.

11. The system of claim 7, wherein a difference between the ON and OFF state angles is from 16° to 22°.

12. The system of claim 7, wherein a difference between the ON and OFF state angles is 22° or lower.

13. The system of claim 1, wherein the mirror plate is attached to a deformable hinge and is at a different plane than the deformable hinge.

14. The system of claim 13, wherein the hinge is disposed at a side of the mirror plate opposite to the incident light.

15. The system of claim 13, wherein each micromirror further comprises: a post to which the deformable hinge is affixed thus held thereby.

16. The system of claim 15, wherein the post comprises a light absorbing material coated thereon for absorbing scattered light.

17. The system of claim 15, wherein the array of micromirror devices further comprises micromirror device without a post.

18. The system of claim 1, wherein a gap between adjacent micromirrors in the micromirror array is 0.5 micron or less.

19. The system of claim 1, wherein the gap between adjacent micromirrors in the micromirror array is from 0.1 to 0.5 micron.

20. The system of claim 1, further comprising: another electrode having thereon a constant bias voltage in operation.

21. The system of claim 1, further comprising:
a condensing lens whose f-number is from f/1.8 to f/4 with f being a focal length of the condensing lens.

22. The system of claim 21, wherein the f-number of the condensing lens is f/2.4.

23. The system of claim 1, further comprising:
a projection lens whose f-number is from f/1.8 to f/4 with f being a focal length of the condensing lens.

24. The system of claim 23, wherein the f-number of the projection lens is f/2.4.

25. The system of claim 1, wherein the mirror plate has a zigzagged edge.

26. The system of claim 22, wherein the illumination light is incident towards the zigzagged edge of the mirror plate.

27. The system of claim 1, wherein the mirror plate comprises a reflecting surface of a metallic material.

28. The system of claim 27, wherein the metallic material is gold.

29. The system of claim 27, wherein the metallic material is silver.

30. The system of claim 27, wherein the metallic material is aluminum.

31. The system of claim 1, wherein the mirror plate comprises a tapered side edge.

32. The system of claim 1, wherein the micromirror is positioned in a device package that comprises a package substrate and a package cover between which the micromirror array devices are positioned.

33. The system of claim 32, wherein the package cover is transmissive to the illumination light from the light source; and is positioned not parallel to the mirror plates at a non-deflected state.

34. The system of claim 32, wherein the package cover comprises a light absorbing mask for absorbing the illumination light incident onto the circumference of the package cover.

35. The system of claim 32, wherein the package further comprises a light absorbing material.

36. The system of claim 35, wherein the light absorbing material is on the package substrate.

37. The system of claim 35, wherein the light absorbing material is on a side wall of the package substrate.

38. The system of claim 35, wherein the package cover is bonded to the package substrate.

39. The system of claim 1, wherein the system is a rear-projection television.

40. The system of claim 1, wherein the system is a front-projection television.

41. A projection system, comprising:
a light source;
a spatial light modulator comprising an array of micromirror devices, wherein each micromirror device comprises a deflectable and reflective mirror plate that is attached to a deformable hinge, and is operable to rotate to an ON state angle in response to an electrostatic force, but to an OFF state angle under a mechanical restoration force in the deformable hinge; and
an optical element for directing light onto the spatial light modulator;
wherein the system has a contrast ratio of 1200:1 or more.

42. The system of claim 41, wherein a difference between the ON and OFF state angles is from 12° to 18°.

43. The system of claim 41, wherein a difference between the ON and OFF state angles is from 16° to 22°.

44. The system of claim 41, wherein a difference between the ON and OFF state angles is 22° or less.

45. The system of claim 41, wherein each mirror plate is associated with one addressing electrode for deflecting the mirror plate to the ON state.

46. The system of claim 41, wherein the mirror plate is at a different plane than the hinge when the mirror plate is not deflected.

47. The system of claim 41, wherein the contrast ratio is 1500:1 or higher.

48. The system of claim 41, wherein the contrast ratio is 2000:1 or higher.

49. The system of claim 41, wherein the system is a rear-projection television.

50. The system of claim 41, wherein the system is a front-projection television.

51. A projection system, comprising:
a light source;
a spatial light modulator comprising an array of micromirror devices, wherein each micromirror device comprises a deflectable and reflective mirror plate that is attached to a deformable hinge, and is operable to rotate to an ON state angle and an OFF state angle, wherein a difference between the ON and OFF state angles is from 12° to 22°; and
an optical element for directing light onto the spatial light modulator;
wherein the system has a contrast ratio of 1200:1 or more.

52. The system of claim 51, wherein the mirror plate is operable to rotate to the ON state angle in response to an electrostatic force, but to the OFF state angle under a mechanical restoration force in the deformable hinge.

53. The system of claim 51, wherein the contrast ratio is 1500:1 or higher.

54. The system of claim 51, wherein the contrast ratio is 2000:1 or higher.

55. The system of claim 51, wherein the mirror plate is at a different plane than the deformable hinge.

56. The system of claim 51, wherein the system is a rear-projection television.

57. The system of claim 51, wherein the system is a front-projection television.

58. A projection system, comprising:
a light source providing light for the system;
a spatial light modulator comprising an array of micromirror devices, wherein each micromirror device has a mirror plate attached to a deformable hinge, and is operable to rotate to an ON state angle that is 14° degrees or more relative to a non-deflected state; and an optical element for directing the light onto the spatial light modulator, wherein the display system has a contrast ratio of 1200:1 or higher.

59. The projection system of claim 58, wherein the mirror plate is associated with one single electrode for addressing and rotating the mirror plate.

60. The projection system of claim 59, wherein the addressing electrode is on a semiconductor substrate formed thereon an electric circuitry.

61. The projection system of claim 58, wherein the ON state angle is 16° or more.

62. The projection system of claim 58, wherein the ON state angle is 18° or more.

63. The projection system of claim 58, wherein the mirror plate is operable to rotate to an OFF state angle relative to the non-deflected state.

64. The projection system of claim 58, wherein the OFF state angle is 0 degree.

65. The projection system of claim 58, wherein the OFF state angle is from 1° to −6°.

66. The projection system of claim 58, wherein the OFF state angle is from −1° to −5°.

67. The projection system of claim 58, wherein the contrast ratio is 1500:1 or higher.

68. The projection system of claim 58, wherein the contrast ratio is 2000:1 or higher.

69. The projection system of claim 58, wherein the mirror plate is in a separate plane from that of the deformable hinge.

70. A projection system, comprising:

a light source providing light for the system;

a spatial light modulator comprising an array of micromirror devices, wherein each micromirror device further comprises:

a mirror plate; and a deformable hinge;

wherein the mirror plate is attached to the hinge such that the maximum angle achievable by the mirror plate rotating in a first direction is different from that of the mirror plate rotating in a second direction opposite to the first direction; and an optical element for directing the light onto the spatial light modulator, wherein the display system has a contrast ratio of 1200:1 or higher.

71. The projection system of claim 70, wherein the mirror plate is associated with one single electrode for addressing and rotating the mirror plate.

72. The projection system of claim 71, wherein the addressing electrode is on a semiconductor substrate formed thereon an electric circuitry.

73. The projection system of claim 71, wherein the achievable maximum angle in the first direction is an ON state angle of 16° or more.

74. The projection system of claim 73, wherein the ON state angle is 18° or more.

75. The projection system of claim 71, wherein the achievable maximum angle in the second direction is an OFF state angle that is 0 degree.

76. The projection system of claim 71, wherein the achievable maximum angle in the second direction is an OFF state angle that is −1° to −5°.

77. The projection system of claim 71, wherein the contrast ratio is 1500:1 or higher.

78. The projection system of claim 71, wherein the contrast ratio is 2000:1 or higher.

79. The projection system of claim 71, wherein the mirror plate is in a separate plane from that of the deformable hinge.

* * * * *